May 23, 1950     H. B. WARNOCK     2,509,179
FISH LURE
Filed May 31, 1946
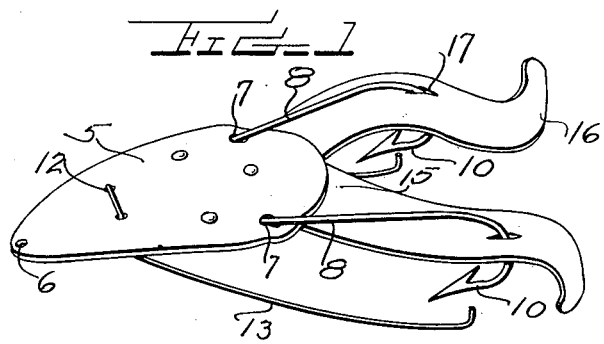
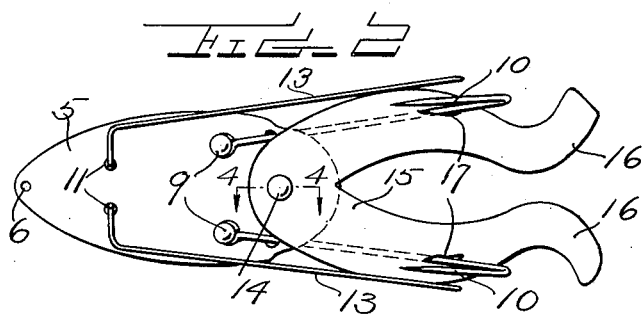
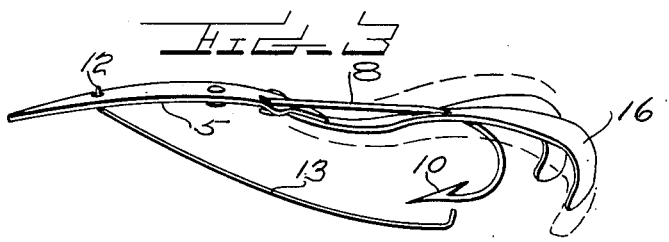
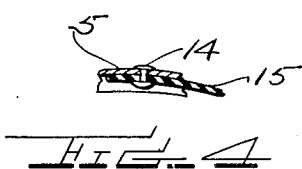
INVENTOR
*H. B. WARNOCK*
BY
*Mason, Porter, Miller & Stewart*
ATTORNEYS Patented May 23, 1950

2,509,179

UNITED STATES PATENT OFFICE 2,509,179

FISH LURE

Howard B. Warnock, Minster, Ohio

Application May 31, 1946, Serial No. 673,231

4 Claims. (Cl. 43—42.3)

The invention to which the following specification relates is an improvement in fish lures of the type which is used in casting. Fundamentally, the invention consists of the usual spoon to which a pair of fish hooks has been attached. A flexible member is associated with both the spoon and the hooks. This member has two branches or bifurcations extending to the rear of the spoon and connected loosely with the hooks. When the spoon is drawn through the water, these flexible branches give the illusion of frog's legs and flutter in a life-like manner similar to swimming.

It is the purpose of my invention to provide a simple but rugged lure which will be quite attractive to game fish.

It is also an object of my invention to connect the movable parts of the lure with the fish hooks proper so that the hooks are shielded and at the same time it is more certain that the fish will take the hook when snapping at the lure.

Other objects of my invention will be apparent from the following description of the preferred form as illustrated in the accompanying drawings in which;

Fig. 1 is a perspective view of the improved fish lure;

Fig. 2 is a bottom view of the lure;

Fig. 3 is a side elevation of the same and

Fig. 4 is a longitudinal cross section on the line 4—4 of Fig. 2 showing the fastening of the lure to the spoon.

The invention is developed on the conventional arrangement of a concave spoon with one or more fish hooks. Thus I have provided a concave generally oval spoon 5. The leading or narrow end of this spoon has an opening 6 for connection to the fish line. The broader rear end has two laterally spaced holes 7, 7.

I use a pair of fish hooks 8, 8. Each hook has its shank threaded down through a hole 7 and forward over the concave surface of the spoon. Spaced from the holes 7, the concave surface of the spoon has a pair of spaced studs 9, 9. These studs are somewhat inward from the holes 7, 7. Thus when the shanks of the hooks 8, 8 are threaded through the opening 7 and fastened around the studs 9, the barbed ends of the hooks extend divergently from the rear of the spoon as shown in Fig. 2. It will, of course, be understood that the barbs 10, 10 are pointed downwardly or on the concave side of the spoon.

Two spaced holes 11 are found in the forward part of the spoon. A flexible wire 12 has its mid portion passed through holes 11, 11 and the branches 13, 13 extend resiliently to the rear beneath the barbs 10 of the hooks. Thus, a flexible or resilient means is provided for clearing weeds away from the path of the hooks.

Intermediate the holes 7, 7 and extending outwardly of the concave side of the spoon, I provide a stud 14.

A flexible sheet member 15 is snapped over the head of the stud 14 in the manner shown in Fig. 4. It is to be understood that the member 15 is replaceable and exchangeable so that it may be altered in form and color to suit the particular fishing needs.

Member 15 is bifurcated to provide branches 16, 16. Intermediate their length the branches 16 are perforated to provide loose slots or holes 17. The barbs 10 are threaded downwardly through the branches 16.

The shanks of the hooks thus form loose pivotal points around which the free ends of the lure 15 may move. In Fig. 3 I have shown in dotted lines the manner in which the branches may rise and fall. At the same time due to the curved form of the branches 16, 16, they may wobble or rock transversely as the lure is drawn through the water.

It will also be apparent that the concave spoon will create a wave movement in the water and that the lure 15 is disposed directly in this wave and will, therefore, be given a corresponding movement.

When desired, the member 15 may be renewed or replaced in an obvious manner.

The above description relates to the preferred form of my invention. However, various modifications may be carried out in simulating other forms of bait. Likewise, a wide variety of materials can be utilized. Consequently it is to be understood that my invention is limited only by the terms of the following claims.

What I claim is:

1. A fish lure comprising a concave, oval spoon having a pair of spaced holes near its broader end, a pair of fish hooks, each hook having its shank passing through one of said holes, means for attaching the inner ends of the hooks to the spoon so that the hooks extend divergently and downwardly beyond the spoon, and a bifurcated flexible sheet member attached to the spoon between the hooks, said member having a portion underlying each hook and free to vibrate relatively thereto.

2. A fish lure comprising a downwardly concave, oval spoon having a pair of spaced holes near its broader end, a pair of fish hooks, each hook having its shank passing through one of said holes, means for attaching the inner ends of the hooks to the lower side of the spoon so that the hooks extend divergently downward beyond the spoon, and a bifurcated flexible sheet member attached to the lower surface of the spoon between the hooks, said member having an opening at an intermediate point in each bifurcation through which a hook protrudes downwardly.

3. A fish lure comprising a concave, oval spoon having a pair of spaced holes near its broader end, a pair of fish hooks, each hook having its shank passing through one of said holes, means for attaching the inner ends of the hooks to the spoon so that the hooks extend divergently beyond the spoon, a stud on the lower surface of the spoon between the hooks, and a bifurcated flexible sheet member attached at its mid-point to the stud and having an opening at an intermediate point in each bifurcation through which a hook protrudes downwardly.

4. A fish lure comprising a downwardly concave, oval spoon having a pair of spaced holes near its broader end, a pair of fish hooks, each hook having its shank passing through one of said holes, means for attaching the inner ends of the hooks to the spoon so that the hooks extend downwardly and divergently beyond the spoon, a bifurcated flexible sheet member attached at its midpoint to the lower surface of the spoon and having portions underlying each hook and free to vibrate relatively thereto, and a wire guard attached at its mid-point to the concave side of the spoon and extending backwardly below the hooks and outside of the flexible member.

HOWARD B. WARNOCK.

REFERENCES CITED

The following references are of record in the file of this patent:

UNITED STATES PATENTS

| Number | Name | Date |
|---|---|---|
| 1,248,213 | Grothkopf | Mar. 5, 1918 |
| 1,709,010 | Foss | Apr. 16, 1929 |
| 2,197,209 | Eppinger | Apr. 16, 1940 |